(12) United States Patent
Berg, Jr. et al.

(10) Patent No.: US 6,446,298 B1
(45) Date of Patent: Sep. 10, 2002

(54) SCRAPER FOR ANIMAL STALLS

(75) Inventors: Vernon R. Berg, Jr., Marshfield; Leon D. Johnson, Arpin, both of WI (US)

(73) Assignee: Berg Equipment Company, Marshfield, WI (US)

( * ) Notice: Subject to any disclaimer, the term of this patent is extended or adjusted under 35 U.S.C. 154(b) by 0 days.

(21) Appl. No.: 09/457,032

(22) Filed: Dec. 7, 1999

(51) Int. Cl.7 .............................................. B65G 25/04
(52) U.S. Cl. ...................... 15/93.1; 198/748; 198/749; 119/451; 119/479
(58) Field of Search ................................ 15/93.1, 93.3; 119/451, 458, 479, 527; 198/748, 749

(56) References Cited

U.S. PATENT DOCUMENTS

| | | | |
|---|---|---|---|
| 2,264,939 A | * 12/1941 | Hawkins | |
| 2,552,743 A | * 5/1951 | Simpson | |
| 3,306,435 A | * 2/1967 | Wenger | |
| 3,458,029 A | * 7/1969 | Allen et al. | |
| 4,243,137 A | 1/1981 | Laurenz | 198/748 |
| 4,320,008 A | * 3/1982 | Kokubo | 198/748 |
| 5,010,620 A | 4/1991 | Young | 15/347 |
| 5,450,815 A | 9/1995 | Krehl et al. | 119/479 |
| 5,607,046 A | 3/1997 | Krehl et al. | 119/451 |
| 5,662,068 A | 9/1997 | Childs | 119/451 |
| 5,950,565 A | 9/1999 | Guyot | 119/479 |

FOREIGN PATENT DOCUMENTS

| | | | | |
|---|---|---|---|---|
| DE | 2209309 | * | 9/1972 | 15/93.3 |
| SU | 976911 | * | 12/1982 | 119/451 |

* cited by examiner

Primary Examiner—Gary K. Graham
(74) Attorney, Agent, or Firm—Ryan Kromholz & Manion, S.C.

(57) ABSTRACT

A scraper for removing debris from the floor of an animal stall includes a central frame member oriented generally parallel to the direction of movement of the scraper assembly and a cross frame member integral with the central frame member, the cross frame member having opposed first and second ends. First and second beams are pivotally supported on the first and second frame member ends and are generally parallel to the cross frame member. First and second scraper blades are pivotally supported, respectively, by the first and second beams, the blades being pivotal from a vertical orientation adapted for scraping a floor surface during advancement of the blade assembly in a first direction and pivotal to elevated, non-scraping orientation for retraction of the assembly in a direction opposite from the scraping direction. Preferably, a pair of end scrapers are supported by the outer ends of each of the two beams and hingedly connected thereto by a vertical hinge. These extension blade end scraper members are, thus, pivotal from an orientation generally parallel to the beams for scraping of a floor surface and pivotal to a second orientation generally perpendicular to the beams for retraction of the scraper device in a non-scraping direction.

6 Claims, 4 Drawing Sheets

SCRAPER FOR ANIMAL STALLS

This invention relates to equipment for animal husbandry. More specifically the invention relates to a scraper device particularly suited for clean up of cattle confinement areas such as barns, free stalls and pits.

BACKGROUND OF THE INVENTION

Various scraper devices have heretofore been utilized for the clean up of cattle stalls and barns. Typically such devices employ some type of scraper blade. With conventional blades, however, clean up efficiency is reduced by the fact that if a straight blade encounters an irregularity in the floor surface, a one piece blade is caused to rise up and thus leave areas which are not scraped clean.

One type of scraper assembly is shown in U.S. Pat. No. 4,243,137 wherein a pair of scraper blades are hingedly connected to a frame. However, to allow the blades to move vertically the device of that patent requires that the blades be formed of several components which are loosely bolted together, thus reducing the ability to maintain downwardly directed scraping forces.

A need has existed for improved scraper devices for use in cleaning up of animal manure from floor surfaces which enable improved cleanup of floor surfaces that are characterized by various surface irregularities.

SUMMARY OF THE INVENTION

The present invention relates to an improved scraper mechanism particularly useful in cleaning up of stalls such as free stalls wherein animals are free to roam within the stall structure. In accordance with one aspect of the invention the scraper mechanism is supported on a frame structure which enables movement of the scraper in reciprocating travel paths which enables the scraping of a selected floor surface similar to that shown in connection with the above-mentioned '137 patent. In accordance with a related aspect the scraper mechanism can be moved by means of existing power sources such as motorized cables, chains or the like.

In accordance with a further aspect of the invention the scraper device consists of several sections which enable efficient scraping by one end of the scraper device even if the opposite end encounters an irregular or raised area on a stall floor surface. In accordance with a further related aspect, each of a pair of blade-supporting beams are supported independently of each other, being separately pivotally supported by a cross frame component of the frame structure. In accordance with a still further aspect of the invention the blade sections are mounted so that they can be pivoted upwardly into a non-scraping orientation when the blade is retracted and which will again be lowered for further scraping when the blade is advanced.

In accordance with still further aspects of the invention the frame, further, supports end sections of the scraper which are pivotally attached so that they can swing backwardly into an extended orientation someone less than parallel to the frame cross axis but will pivot to an orientation perpendicular to that axis when the device is retracted. In accordance with still further aspects of the invention, a novel structure is provided on the blades which cause the blades to be pivoted upwardly to the non-scraping position when the mechanism is retracted and once again fall to a vertical scraping orientation when the blade is once again advanced.

Briefly, the invention provides a scraper for removing debris from the floor of an animal stall which includes a central frame member oriented generally parallel to the direction of movement of the scraper assembly and a cross frame member integral with the central frame member, the cross frame member having opposed first and second ends. First and second beams are pivotally supported on the first and second frame member ends and are generally parallel to the cross frame member. First and second scraper blades are pivotally supported, respectively, by the first and second beams, the blades being pivotal from a vertical orientation adapted for scraping a floor surface during advancement of the blade assembly in a first direction and pivotal to elevated, non-scraping orientation for retraction of the assembly in a direction opposite from the scraping direction. Preferably, a pair of end scrapers are supported by the outer ends of each of the two beams and hingedly connected thereto by a vertical hinge. The extension blade members are, thus, pivotal from an orientation generally parallel to the beams for scraping of a floor surface and pivotal to a second orientation generally perpendicular to the beams for retraction of the scraper device in a non-scraping direction.

Further objects and advantages of the invention will be apparent from the accompanying claims, the detailed description and the drawings.

DETAILED DESCRIPTION OF THE INVENTION

Figure 1:
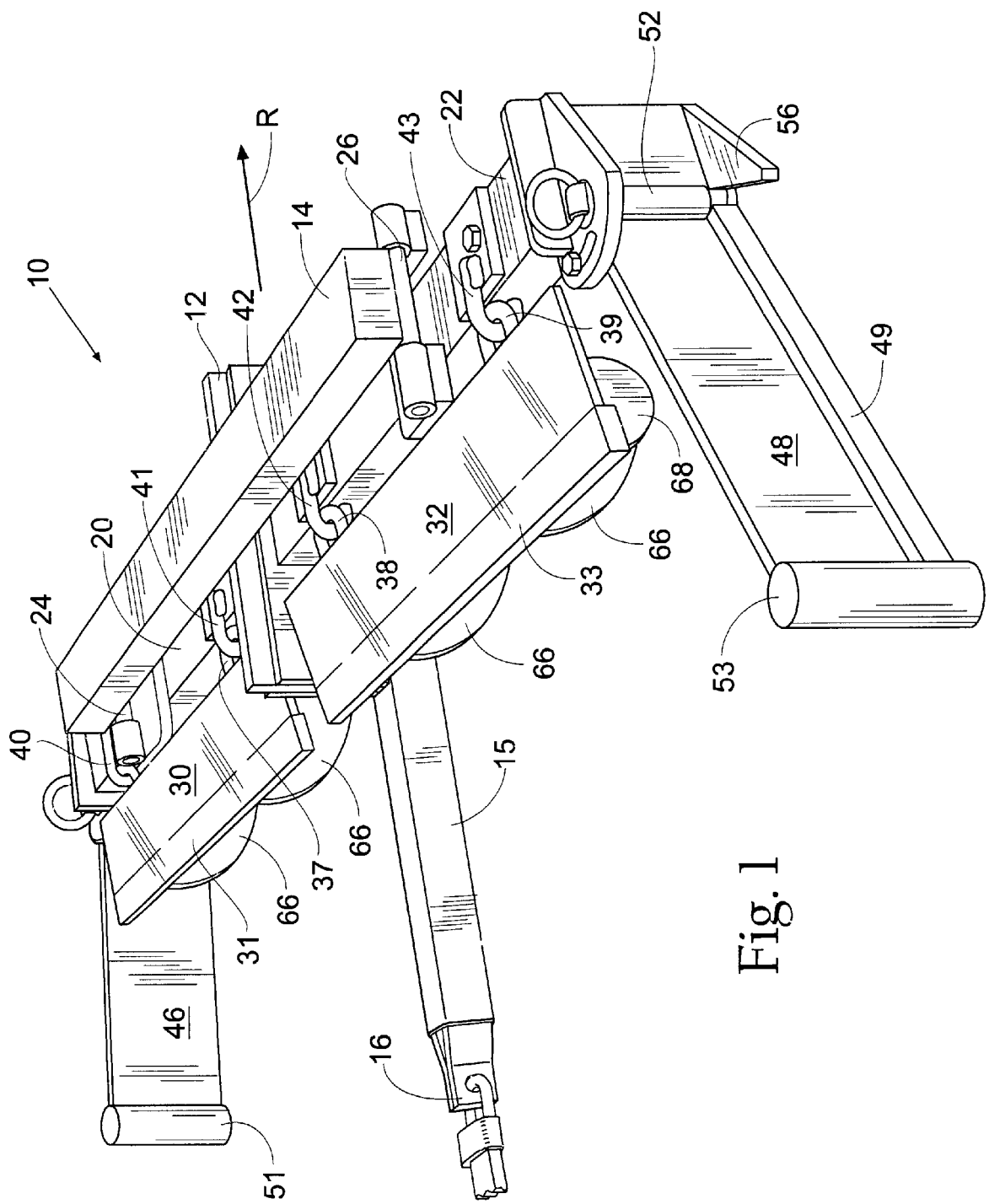
FIG. 1 is a perspective view of a scrapper device of this invention.

Referring more specifically to the drawings there is seen a scraper assembly 10 of the invention. Assembly 10 includes a frame formed by a central member preferably in the form of a plate 12. Integral with the central member is a cross frame member 14 that is elevated above member 12. Also provided is a draw bar 15 which has a forward end 16 used in advancing the device 10 for scraping (in the direction of arrow A) and a rear section 18 used for retraction of the device 10 in a non-scraping orientation (in the direction of arrow R). Pivotally attached to each end of cross frame member 14 are a pair of suspended beams 20 and 22 which are pivotally connected to the ends of frame member 14 by hinges 24 and 26. A pair of blades 30 and 32 are mounted on pivotable beams 20 and 22, respectively. Blade 30 is hingedly connected to beam 20 by means of a pair of loops 36 and 37 which are interconnected with loops 40 and 41 on beam 20. Similarly, a pair of loops 38 and 39 on blade 32 are interconnected, respectively, with a pair of loops 42 and 43 on beam 22.

A blade extension 46 is hingedly connected to beam 20 by means of a vertical hinge 50. Similarly, a blade extension member 48 is hingedly connected to beam 22 by means of a vertical hinge 52. Stops 54 and 56 serve to limit the reward pivoting of extension blades 46 and 48, respectively.

As seen in the drawings blades 30 and 32 have wear surfaces 31 and 33, respectively of increased thickness. Similarly, blade extensions 46 and 48 have thickened wear surfaces 47 and 49, respectively. Also, extensions 46 and 48 have thickened portions preferably in the form of heavy cylindrical rods 51 and 53 welded to the ends thereof. The rods 51 and 53 assist in providing weight to the assembly to improve scrapping efficiency. Also, the enlarged blade ends formed by rods 51 and 53 assist in creating a drag when the scrapper assembly is moved in the reverse direction shown in FIGS. 1 and 2. This insures that the blade extensions 46 and 48 fold inwardly toward the center of the assembly 10 thereby minimizing the scraping to and fro of manure on the floor surface 58.

Figure 2:
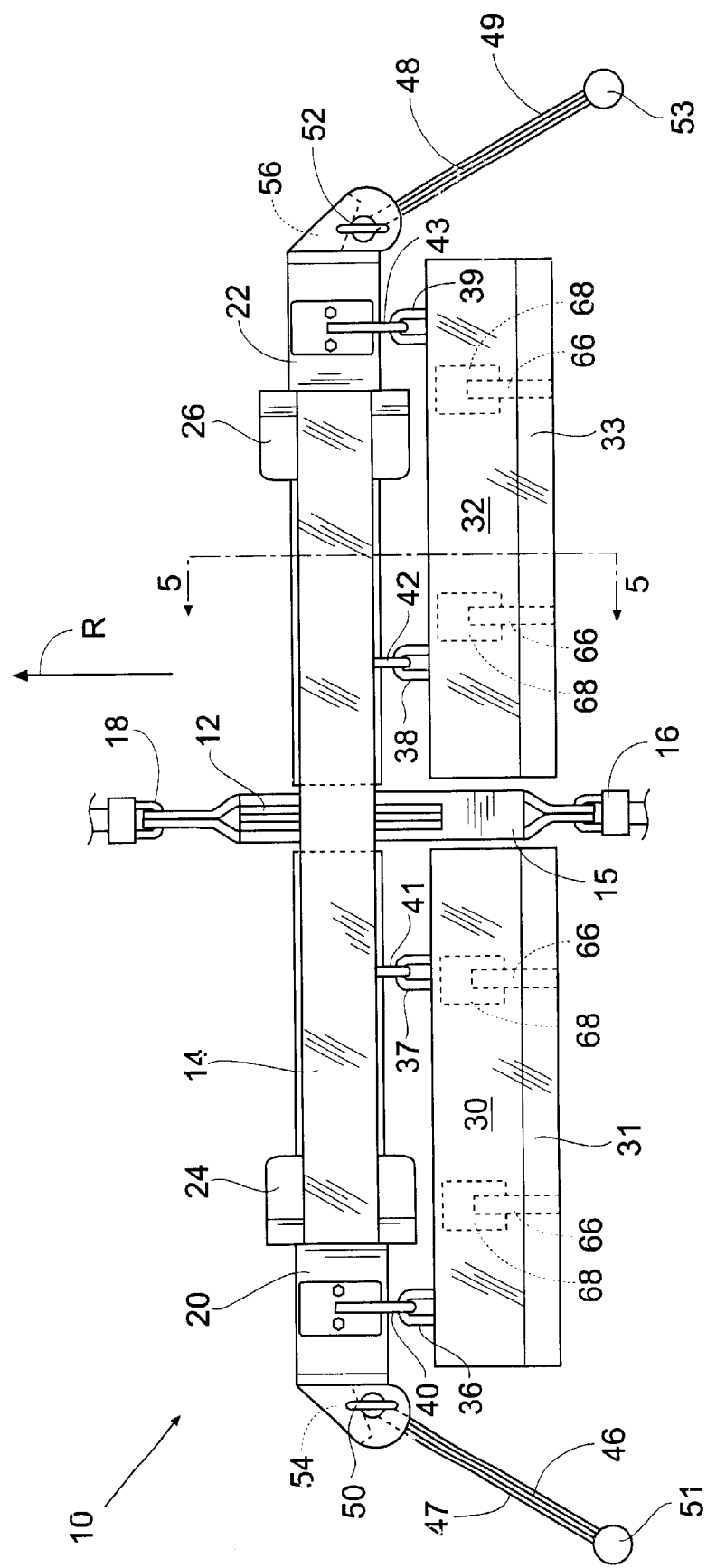
FIG. 2 is a top planned view of the scrapper of FIG. 1.
Figure 3:
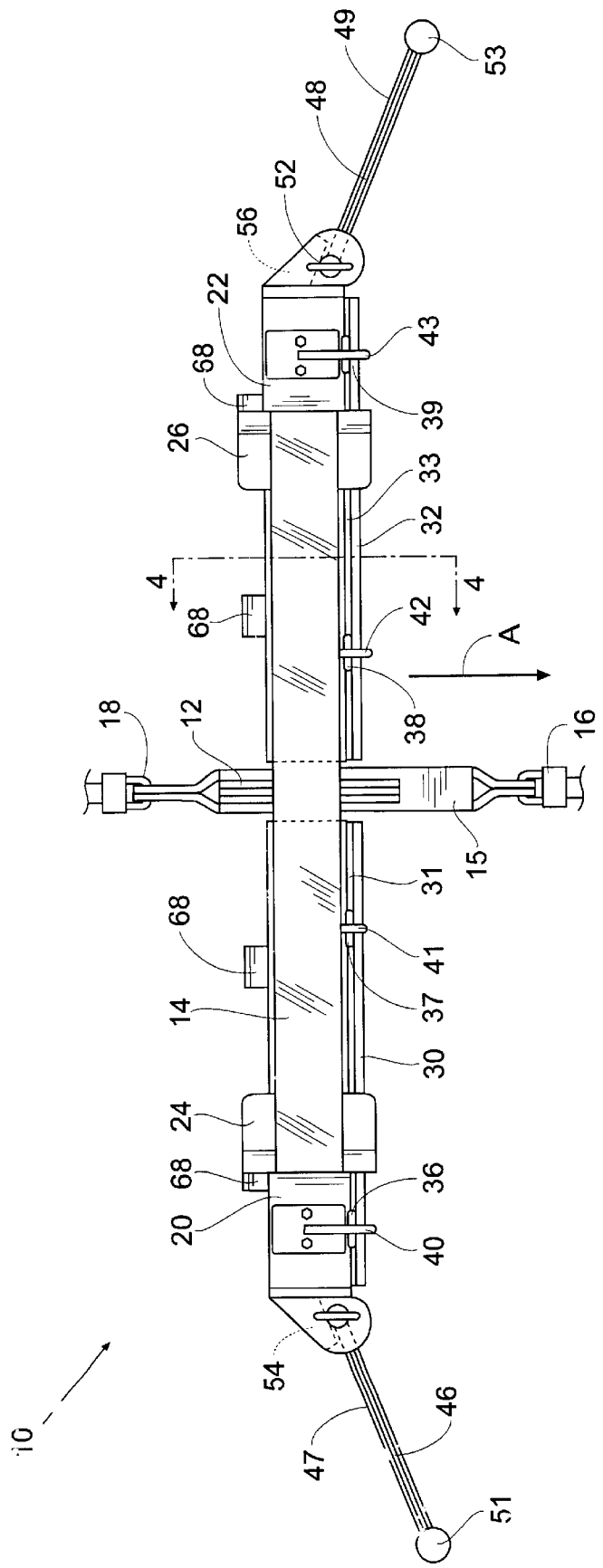
FIG. 3 is a top planned view of the scrapper in the forwardly advancing, scraping position.
Figure 5:
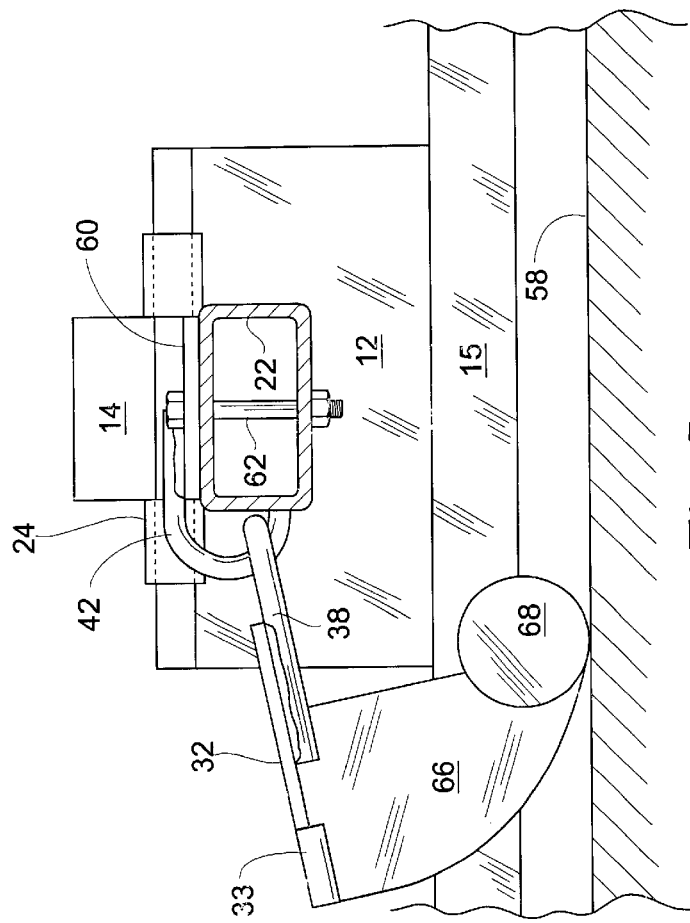
FIG. 5 is a fragmentary cross-sectional view taken along Line 5—5 of FIG. 2.
Figure 4:
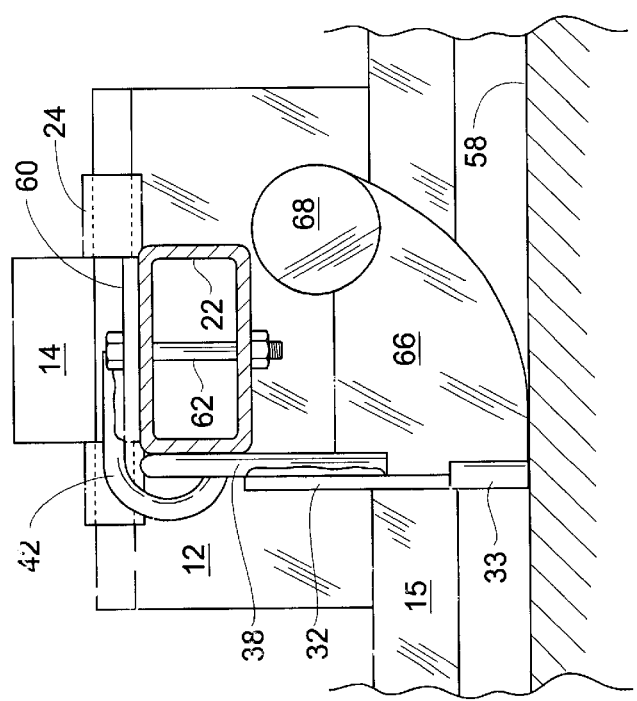
FIG. 4 is a fragmentary sectional view taken along Line 4—4 of FIG. 3.

As is best seen in FIGS. 4 and 5, curved plates 66 are welded to the rear of blades 30 and 32. The curved plates 66 each terminate in a thickened cylindrical disk-shaped end 68. As seen in FIGS. 4 and 5 plates 66 serve as cam followers as they slide forward and backward along floor surface 58. When the assembly is advanced in the direction of Arrow A, the blades 30 and 32 are allowed to fall to the vertical position shown in FIG. 3. In this case the thickened end disks 68 serve to add weight to the assembly, improving the scraping efficiency on the floor surface 58. Then, when the scrapper assembly 10 is retracted in the direction of Arrow R, as seen in FIGS. 1 and 2, the cam following action of the plate 66 causes the blade 32 to rise as seen in FIG. 5 and end disk 68 serves as a counterweight to assist in lifting of the blades. Also, in the blade-raised position, they provide curved slide surfaces of minimized friction for retraction of the assembly along floor 58.

Also best seen in FIGS. 4 and 5 are the details of the hinge arrangement formed by loops 38 and 40. As seen, loop 42 is welded to a plate 60 which is attached beam 22 by means of a bolt 62.

In operation it will be seen, that since beams 20 and 22 are suspended by hinges 24 and 26 at the outer ends of frame member 14, the blades 30 and 32 can, to a degree, rise and fall relative to each other when irregularities such as humps in the floor surface 58 are encountered. Thus the ability of beams 20 and 22 to pivot on the ends of frame member 14 greatly enhances the scrapping efficiency of blades 30 and 32.

Further modifications and variations of the invention will be apparent to those skilled in the art. Thus, the invention should be considered limited only by the scope of the following claims and including equivalents thereof.

What is claimed is:

1. A scraper assembly for removing debris from the floor of an animal stall comprising:
    a central frame member oriented generally parallel to a direction of movement of the scraper assembly and a cross frame member integral with the central frame member, said cross frame member having opposed first and second ends,
    first and second beams pivotally supported on said first and second ends and being generally parallel to the cross frame member,
    first and second scraper blades pivotally supported, respectively, by the first and second beams, said blades being pivotal from a vertical orientation adapted for scraping a floor surface during advancement of said blade assembly in a scraping direction and pivotal to elevated, non-scraping orientation for retraction of said assembly in a non-scraping direction opposite from said scraping direction.

2. A scraper, assembly according to claim 1 further comprising an end scraper supported by an outer end of each of said first and second beams and hingedly connected thereto by a vertical hinge whereby said extension blade members are pivotal from an orientation generally parallel to said beams for scraping of a floor surface and pivotal to a second orientation generally perpendicular to said beams for retraction of said scraper device in said non-scraping direction.

3. A scraper assembly according to claim 1 wherein a convex plate is attached to a rear of each said blade members, said plates being convexly curved so that said blades are supported vertically during scraping, and when said device is retracted, said plates act as cam followers on a scraped substrate, whereby said blades are elevated to the non-scraping orientation during retraction of said device.

4. A scraper assembly according to claim 1 wherein each end of said cross beams is hingedly connected at its center to its respective end of said frame member.

5. A scraper assembly according to claim 1 further comprising a draw bar integral with said central frame member adapted to advance and retract said device.

6. A scraper assembly according to claim 1 wherein said blades are connected to said pivotal beams by means of a plurality of supporting loops.

* * * * *